United States Patent [19]

Smith

[11] 3,857,070

[45] Dec. 24, 1974

[54] SINGLE-LAMP GROUND DETECTOR FOR CONVERTER-INVERTER POWER SUPPLIES

[75] Inventor: Jay E. Smith, Pittsburgh, Pa.

[73] Assignee: The United States of America as represented by the U.S. Atomic Energy Commission, Washington, D.C.

[22] Filed: Sept. 7, 1973

[21] Appl. No.: 395,328

[52] U.S. Cl. .................... 317/18 R, 321/12, 324/51, 340/255
[51] Int. Cl. ............................................. H02h 7/14
[58] Field of Search .......... 340/255; 324/51; 321/5, 321/12, 45; 317/18 R

[56] References Cited
UNITED STATES PATENTS 2,079,636   5/1937   Sharp ............................... 317/18 R
3,441,801   4/1969   Kraus ............................... 317/18 R
3,716,775   2/1973   Skogsholm ............................ 321/5

OTHER PUBLICATIONS

Loewe, Allis Chalmers Electrical Review, "Check That Ground," 4/48.

Primary Examiner—James D. Trammell
Attorney, Agent, or Firm—John A. Horan; Dean E. Carlson; Bernice W. Freundel

[57]    ABSTRACT

A single-lamp ground detector is used in a converter-inverter power supply system. In can sense grounds on any one of the three busses, AC input, DC link and AC output.

4 Claims, 1 Drawing Figure

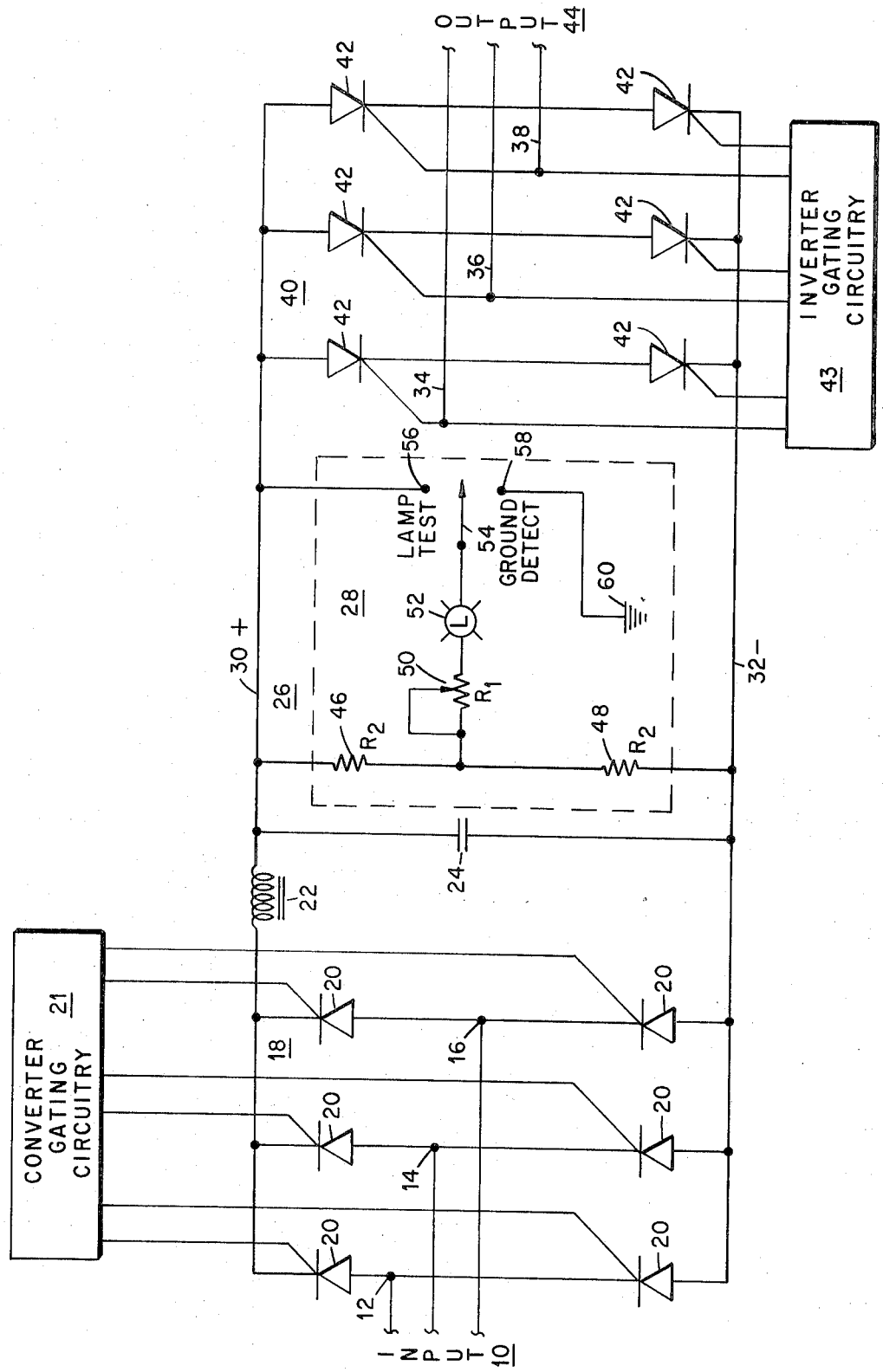

SINGLE-LAMP GROUND DETECTOR FOR CONVERTER-INVERTER POWER SUPPLIES

BACKGROUND OF THE INVENTION

There exists a need for a simple reliable ground detection system for use with a converter-inverter power supply system. Such detection systems are required, for example, in shipboard power supplies. Many ground detection systems are currently available to obtain a fault indication for single bus systems. Through the use of various, sometimes elaborate, switching networks these ground detectors can also be used for many bus systems. A three bus system having AC input, DC link and AC output would require either three distinct ground detectors or a complicated switching technique.

The currently available ground detectors fall into two distinct categories: meter-type and lamp-type. The meter-type is the more complicated one. It often contains a DC power supply, a meter, various other components and complex switching means. The prior art lamp-type usually contains two lamps for DC or single-phase AC busses and three lamps for three-phase AC busses. These fault detectors are not well suited to AC-DC-AC power converters. Prior art ground detectors can sense grounds only on the bus to which the connection is made.

SUMMARY OF THE INVENTION

The present single-lamp ground detector comprises a single detector which can sense grounds, or low insulation resistance, on any of three busses in a 3-phase AC input, DC link and 3-phase AC output power supply system. It has the advantage of being simpler and more reliable than existing ground detectors.

It is an object of this invention to provide a single-lamp ground detector which could be used in almost any power system where isolation from ground is important.

BRIEF DESCRIPTION OF THE DRAWING

The sole FIGURE is a schematic diagram illustrating in detail the ground detection system of the present invention.

DESCRIPTION OF THE PREFERRED EMBODIMENT

The drawing shows the ground detector as it would be used on a converter-inverter power supply. The 3-phase AC power supply input 10 is connected through terminals 12, 14, and 16 to a converter circuit 18 having controlled diode rectifiers 20. The controlled diodes 20 are SCR's whose gates are connected to converter gating circuitry 21 designed to control their firing angle. The converter circuit is connected by means of a reactance 22 and capacitor 24 to the DC link 26. The ground detector 28 of this invention is installed on the DC link 26 between positive lead 30 and negative lead 32 where it is able to detect grounds or low insulation resistance anywhere in the system. The DC link 26 is connected to the inverter section 40 having controlled diodes 42. The controlled diodes 42 are SCR's whose gates are connected to inverter gating circuitry 43 designed to control their firing angle. Leads 34, 36, and 38 connect the inverter section to the 3-phase AC output 44.

The components within the dotted line comprising the ground detector 28 will now be described. Between the positive and negative leads 30 and 32 are connected resistors 46 and 48 in series. From their midpoint a variable resistor 50 and a lamp 52 are connected to a switch 54. The switch 54 has a Lamp Test position 56 and a Ground Detect position 58. The Ground Detect position 58 is connected to the only ground in the system at 60.

Operation of the ground detector follows. When the ground detector switch is placed in the Ground Detect position, one side of the lamp is connected to ground. If the system is completely isolated from ground (except through the test switch) the lamp will not light. If, however, there is a non-infinite resistance to ground on either the positive or negative lines of the DC link, there will be a flow of direct current through the lamp and the lamp will light if the fault resistance is low enough. If a fault resistance to ground exists on any of the three output busses the lamp will be energized with a square wave. This is due to the switching nature of the output controlled diodes which alternately connect the faulted line of the three-phase output bus to the positive or negative sides of the DC link. Similar operation exists for a fault on the input three-phase bus except that the waveform of the lamp current is a staircase rather than a square wave due to the variable firing angles of the converter controlled diodes.

The single-lamp ground detector described is usable in power systems where isolation from ground is important. While the invention has been described in its preferred embodiment, various changes and modifications can be made without departing from the scope of the invention.

What is claimed is:

1. A ground detector system for a converter-inverter power supply comprising an AC input converter section, a DC link with a positive and negative line and an AC output inverter section in combination with a fault detecting circuit on the DC link, said fault detecting circuit being connected between the positive and negative lines and comprising a ground detector two-position switch in series with a lamp and a tapped resistor, the ground detector switch having a Lamp Test position connected to the positive line and a Ground Detect position connected to the sole ground, the tapped end of the resistor connected to a common point of two series resistors which are connected between the positive and negative lines, the switch providing that the lamp will light only if there is a fault or non-infinite resistance to ground in one of the AC input lines, AC output lines or DC link when the Ground Detect position is actuated.

2. The ground detector system of claim 1 wherein a fault in the positive or negative line of the DC link will cause a flow of direct current through the lamp when the Ground Detect position is actuated.

3. The ground detector system of claim 1 wherein a fault in the AC input lines will cause the lamp to be energized by a staircase current when the Ground Detect position is activated.

4. The ground detector system of claim 1 wherein a fault in the AC output lines will cause the lamp to be energized by a square wave current when the Ground Detect position is actuated.

* * * * *